United States Patent Office 3,322,800
Patented May 30, 1967

3,322,800
POLYMERIC POLYVALENT METAL SALTS OF CHLORENDIC ACID
Richard B. Tideswell, Buffalo, N.Y., assignor to Hooker Chemical Corporation, Niagara Falls, N.Y., a corporation of New York
No Drawing. Filed July 2, 1962, Ser. No. 207,048
17 Claims. (Cl. 260—429)

This invention relates to new compositions of matter and to processes for producing them. More specifically, the inventive concept herein resides in the preparation of the metal salts of chlorendic acid.

The compounds of the instant invention are useful as fungicides and chelating agents. Further the copper salts can be utilized to produce paint pigments having a better color tone and increased fire retardance.

It is an object of the present invention to provide a novel procedure for the production of metal salts of chlorendic acid, chlorendic anhydride, and mixtures thereof.

A further object of this invention is the provision of an economical and convenient route for the production of these metal salts.

These and other objects will become more obvious from a consideration of the following detailed specification.

Compositions produced in accordance with the instant invention are represented by the following general formula:

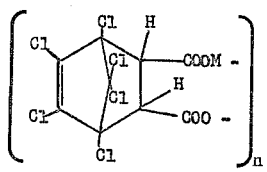

wherein $n$ is an integer from three to eight and M is a divalent metal selected from the group consisting of manganese, copper, lead and mixtures thereof.

The compounds of this invention can be prepared by the auto-oxidation of a metal and the dicarboxylic compound in the presence of a solvent at a temperature of about the reflux temperature of the solvent, but will generally be in the range of from about 50 degrees centigrade to 160 degrees centigrade.

The preferred oxidizing medium utilized is oxygen, however, other oxidizing agents such as air, hydrogen peroxide, and the like can be employed without departing from the scope of the invention.

Examples of suitable solvents include aliphatic ethers, such as methyl ether, methylethyl ether, ethyl ether, methylpropyl ether, ethylpropyl ether, propyl ether, isopropyl ether, ethylbutyl ether, propylbutyl ether, etc., cyclic ethers such as tetrahydrofuran, dioxane, etc., alcohols such as methanol, ethanol, butyl alcohol, amyl alcohol, hexyl alcohol, cetyl alcohol, propyl alcohol, etc., water and ketones such as acetone, methyethyl ketone, diethyl ketone and the like.

Pressure is conveniently atmospheric or close to atmospheric although the process is workable at sub- or super-atmospheric pressures.

In a preferred embodiment equimolar amounts of a fine metal powder and chlorendic acid are refluxed in a solvent with oxygen bubbling through the solution. In a matter of hours a solid precipitates.

It was found convenient to use a slight excess of chlorendic acid. In acetone the polymeric metal salt precipitated from solution. This was filtered and washed with additional acetone to remove unreacted chlorendic acid. Some unreacted metal remained in admixture with the salt. The salt was dissolved in hot tetrahydrofuran and the metal was removed by filtration. The salt repreciptiated from the cooled filtrate.

The rate of salt formation is, of course, dependent on the rate at which oxygen is bubbled through the solution. Reactions that had previously required 20 hours using air at a slow rate were essentially completed in less than an hour with a good oxygen rate. The reactions were filtered when most of the metal had disappeared and the salt was observed in good yield. The time under refluxing conditions varied from one to thirty hours.

The following specific examples further illustrate the invention, however, this detailed disclosure is not to be construed as limiting the scope of the present invention.

*Example 1.*—Preparation of the copper salt of chlorendic acid

Nineteen grams of copper (obtained from Fisher, Fisher Catalog No. C431, an electrolytic dust), 156 grams of chlorendic acid, and 500 ml. of acetone are charged into a reaction flask. The reactants are heated to reflux while oxygen is bubbled through the solution. The copper metal disappears in a blue powder precipitate in several hours. The reaction mixture is filtered and the blue powder is washed with additional acetone to remove unreacted chlorendic acid. The crude weight received is 141 grams. This can be recrystallized from tetrahydrofuran or other solvents. The powder analyzes 13.1% copper and 43.1% chlorine. A molecular weight of 1725 is determined for the salt in tetrahydrofuran with a vapor pressure osmometer. Theoretical values for the dihydrated copper salt of chlorendic acid are 13.1% copper and 43.7% chlorine.

When the copper salt of chlorendic acid is prepared utilizing ethanol in place of the acetone, a light green precipitate, the alcoholate, results which has a copper content of 12.7% and a chlorine content of 42.0%. Theoretical values for the monoalcoholated copper salt of chlorendic acid include a copper content of 12.8% and a chlorine content of 42.8%. The hydrated salts are blue. The anhydrous salt is green.

*Example 2.*—Preparation of the lead salt of chlorendic acid 90 grams of lead, 204 grams of chlorendic acid, and 400 ml. of acetone are charged into a reaction flask. The reactants are heated to reflux while oxygen is bubbled through the solution. The lead metal disappears in a white powder precipitate in several hours. The reaction mixture is filtered and the white powder is washed with additional acetone to remove unreacted chlorendic acid. Recrystallization from tetrahydrofuran yields 71 grams of white powder. The powder analyzes 30.2% lead and 31.2% chlorine. A molecular weight of 1950 is determined for the salt in tetrahydrofuran with a vapor pressure osmometer. Theoretical values for the pentahydrated lead salt of chlorendic acid includes a 30.3% lead content and a 31.2% chlorine content.

*Example 3.*—The manganese salt of chlorendic acid 16.5 grams of manganese and 156 grams of chlorendic acid are charged into a reaction flask which has 400 ml. of acetone in it. The reactants are heated to reflux while oxygen is bubbled through the solution. The manganese metal disappears in a white powder precipitate in a matter of hours. The reaction mixture is filtered and the white powder is washed with additional acetone to remove unreacted chlorendic acid. The crude weight received is 103 grams. This can be recrystallized from cyclohexanone. The powder analyzes 10.4% manganese and 39.7% chlorine. Theoretical values for the pentahydrated manganese salt of chlorendic acid include a manganese content of 10.3 and a chlorine content of 40.1%.

Example 4.—Metal salt of chlorendic anhydride 19 grams of copper, 148 grams of chlorendic anhydride and 400 cc. of acetone are charged into a reaction flask. The reactants are heated at reflux while oxygen is bubbled through the solution. The copper metal disappears in a blue powder precipitate after many hours. The reaction mixture is filtered and the blue powder is washed with additional acetone to remove unreacted chlorendic anhydride. This is recrystallized from toluene to yield 85 grams of blue powder analyzing 13.0% copper and 43.4% chlorine. A molecular weight of 1730 is determined for the salt in tetrahydrofuran with a vapor pressure osmometer. Theoretical values for the dihydrated copper salt of chlorendic acid are 13.1% copper and 43.7% chlorine.

Example 5.—Chlorendic acid and copper oxide 39 grams (0.1 mole) chlorendic acid and 8 grams (0.1 mole) copper oxide are refluxed in acetone for 24 hours. 8 grams of copper oxide are recovered with no apparent reaction.

Molecular weight determinations indicated that the salts produced were polymeric. In the molecular weight range indicated, end-grouping in acid or metal would produce a deviation of about 15% in the chlorine to metal atom ratio. The actual deviation was found to be seldom over 1%. This indicated a cyclic polymer.

Under certain conditions, experimental evidence indicated that these compositions existed in a hydrated form. For example, when ethanol was used as a solvent, the monoalcoholate formed. This light green powder hydrolyzed in boiling water to yield the usual blue dihydrate. The change in color was typical of hydrates and alcoholates. The copper salt prepared under anhydrous conditions was green. The blue hydrated copper salts turned green on drying, however, the above did not prove but only indicated a hydrated form.

While the foregoing describes the preferred embodiments of the invention, it will be understood that departures and modifications will be apparent to those skilled in the art and are considered to fall within the scope of this invention.

I claim:
1. A process for the preparation of a polymeric metal salt of the formula

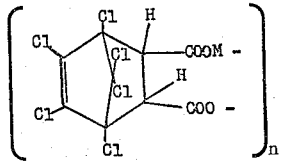

wherein $n$ is an integer from three to eight and M is a metal selected from the group consisting of manganese, copper, lead, and mixtures thereof, which comprises reacting a metal selected from the group consisting of copper, lead, manganese and mixtures thereof and a compound selected from the group consisting of chlorendic acid, chlorendic anhydride, and mixtures thereof, in a solvent for said compound under oxidizing conditions.

2. The process of claim 1 wherein chlorendic acid is employed as a reactant.
3. The process of claim 1 wherein chlorendic anhydride is employed as a reactant.
4. The process of claim 1 wherein the metal is copper.
5. The process of claim 1 wherein the metal is lead.
6. The process of claim 1 wherein the metal is manganese.
7. The process of claim 1 wherein the solvent is acetone.
8. The process of claim 1 wherein the solvent is tetrahydrofuran.
9. The process of claim 1 wherein the solvent is ethanol.
10. The process of claim 1 wherein oxygen is employed as the oxidizing agent.
11. A composition having the formula:

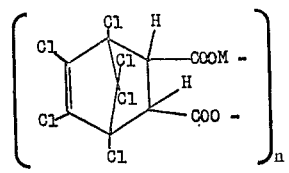

wherein $n$ is an integer from three to eight and M is a metal selected from the group consisting of manganese, copper, lead, and mixtures thereof.

12. The composition of claim 11 wherein M is copper.
13. The composition of claim 11 wherein M is lead.
14. The composition of claim 11 wherein M is manganese.
15. A process for the preparation of a polymeric metal salt of the formula

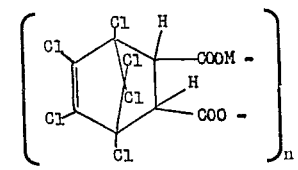

wherein $n$ is an integer from three to eight and M is a metal selected from the group consisting of manganese, copper, lead, and mixtures thereof which comprises reacting an equimolar amount of a metal selected from the group consisting of copper, lead, manganese, and mixtures thereof with an equimolar amount of a compound selected from the group consisting of chlorendic acid, chlorendic anhydride and mixtures thereof at a temperature of from about 50 degrees centigrade to 160 degrees centigrade in a solvent for said compound selected from the group consisting of aliphatic ethers, cyclic ethers, alipatic alcohols, water and aliphatic ketones and in the presence of oxygen.

16. A process for the preparation of a polymeric metal salt is comprising reacting a metal selected from the group consisting of copper, lead, manganese, and mixtures thereof with chlorendic acid at a temperature of about 60 degrees centigrade in acetone and in the presence of oxygen.

17. The composition of claim 11 wherein $n$ is about 3.

References Cited

"Chemical Week," page 19, Nov. 8, 1958.

TOBIAS E. LEVOW, *Primary Examiner.*

ABRAHAM H. WINKELSTEIN, *Examiner.*

W. J. VAN BALEN, A. P. DEMERS,
*Assistant Examiners.*